United States Patent
Kraft et al.

(10) Patent No.: US 7,966,831 B2
(45) Date of Patent: Jun. 28, 2011

(54) APPARATUS AND METHOD FOR SUPPRESSING DYNAMIC PRESSURE INSTABILITY IN BLEED DUCT

(75) Inventors: Robert Eugene Kraft, Cincinnati, OH (US); William Andrew Bailey, Cincinnati, OH (US); William Charles Groll, North Bend, OH (US)

(73) Assignee: General Electric Company, Schenectady, NY (US)

( * ) Notice: Subject to any disclaimer, the term of this patent is extended or adjusted under 35 U.S.C. 154(b) by 1227 days.

(21) Appl. No.: 11/846,220

(22) Filed: Aug. 28, 2007

(65) Prior Publication Data
US 2009/0094989 A1 Apr. 16, 2009

(51) Int. Cl.
*F02C 6/04* (2006.01)

(52) U.S. Cl. .............. 60/785; 60/795; 60/226.1

(58) Field of Classification Search ........... 60/226.1, 60/262, 266, 728, 782, 785; 181/213–216, 181/219; 415/119
See application file for complete search history.

(56) References Cited

U.S. PATENT DOCUMENTS

| | | | | |
|---|---|---|---|---|
| 3,819,008 A * | 6/1974 | Evans et al. | ............. | 181/214 |
| 5,092,425 A * | 3/1992 | Shaw, Jr. | ............. | 181/213 |
| 5,203,163 A * | 4/1993 | Parsons | ............. | 60/226.1 |
| 5,351,473 A | 10/1994 | Shuba | | |
| 6,065,932 A | 5/2000 | Dodd | | |
| 2007/0130912 A1 * | 6/2007 | Kraft et al. | ............. | 60/226.1 |
| 2007/0245738 A1 * | 10/2007 | Stretton et al. | ............. | 60/728 |
| 2007/0245739 A1 * | 10/2007 | Stretton et al. | ............. | 60/728 |
| 2008/0230651 A1 * | 9/2008 | Porte | ............. | 244/118.5 |
| 2009/0007567 A1 * | 1/2009 | Porte et al. | ............. | 60/785 |

OTHER PUBLICATIONS

GE Aircraft Engines, "Precooler Fan Bleed Duct," On sale in USA for more than one year before Aug. 2007.
Hartmann et al., "A New Acoustic Generator. The Air-Jet-Generator," J. Sci. Instr., vol. 4, 1927, pp. 101-111.
Hamed et al., "Numerical Simulation and Parametric Study of Hartmann-Spenger Tube Based Powered Device," AIAA-2003-0550, 2003; pp. 1-10.
GE Aircraft Engines, "General Electric CF6-80C2," Flight International, 1987, single page.
GE Aircraft Engines, "CF6-80C2 Engine Airflow FADEC Control," On sale and in public use in the USA for more than one year before Aug. 2007, single page.

* cited by examiner

*Primary Examiner* — Michael Cuff
*Assistant Examiner* — Phutthiwat Wongwian
(74) *Attorney, Agent, or Firm* — Trego, Hines & Ladenheim, PLLC

(57) ABSTRACT

An apparatus and method for suppressing dynamic instability in a bleed duct of a gas turbine engine includes a fan bypass duct configured to permit a flow of air through the gas turbine engine. The fan bypass duct defines a fan duct surface, and the bleed duct has an inlet in fluid communication with the fan bypass duct and a flow control valve having an opened position and a closed position. A flow diverter is positioned on the fan duct surface proximate the inlet of the bleed duct and diverts the flow of air from the inlet when the flow control valve is closed, while permitting a portion of the flow of air to enter the inlet when the flow control valve is opened.

18 Claims, 4 Drawing Sheets

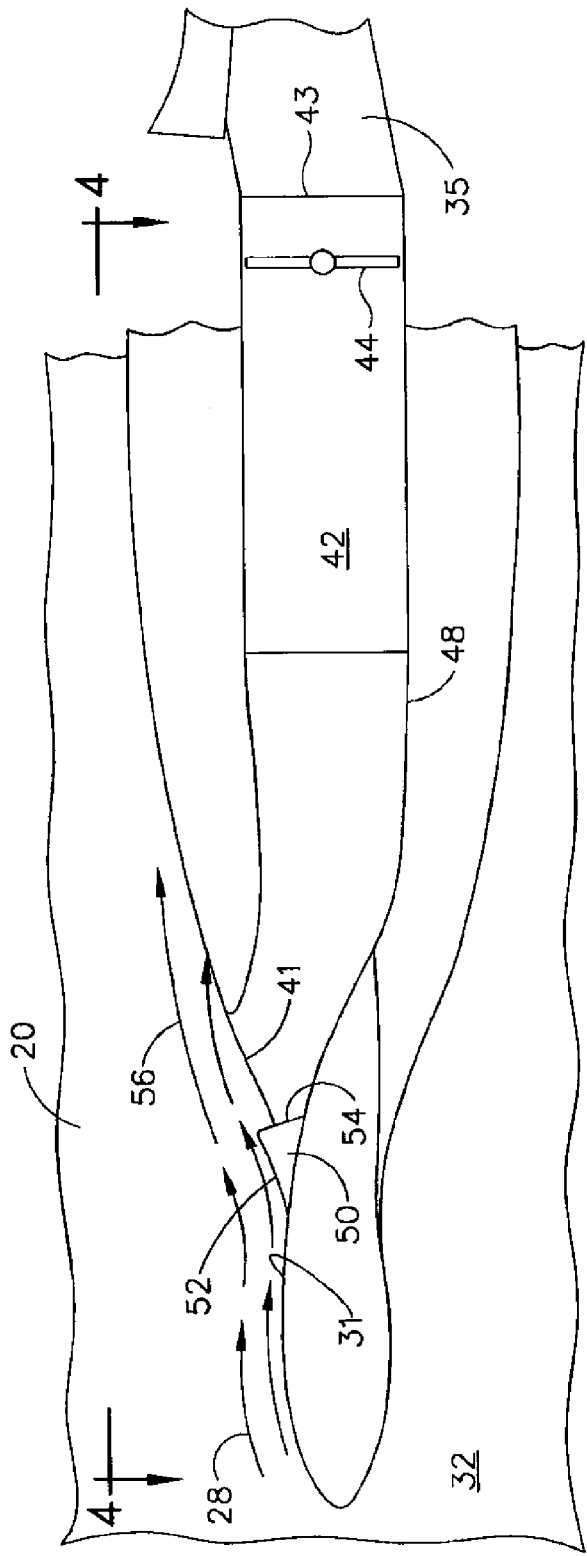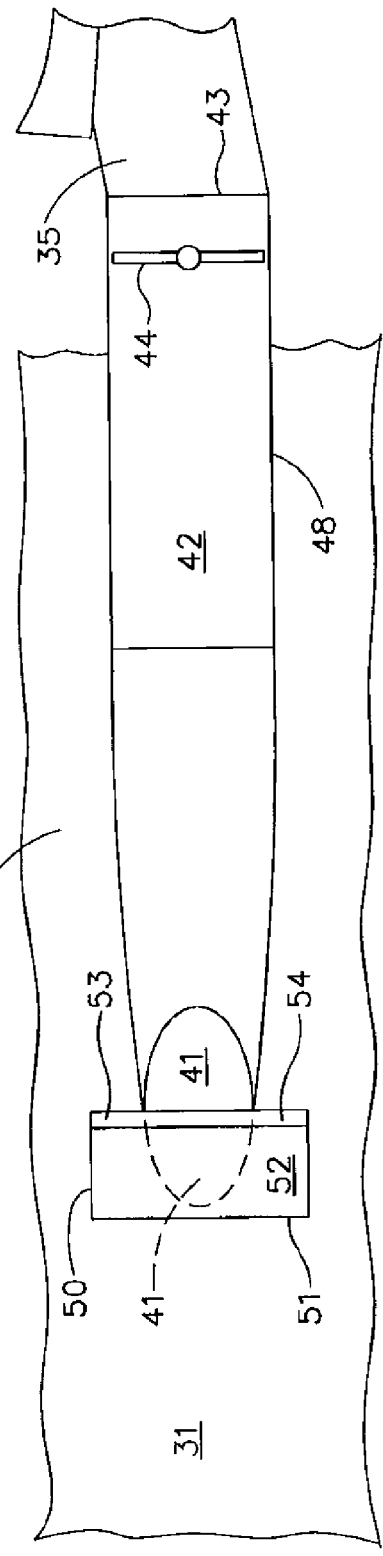

APPARATUS AND METHOD FOR SUPPRESSING DYNAMIC PRESSURE INSTABILITY IN BLEED DUCT

BACKGROUND OF THE INVENTION

This subject matter disclosed in this application relates generally to components for gas turbine engines, and more particularly, to an apparatus and method for suppressing dynamic pressure instability in a bleed duct of a gas turbine engine.

Bleed ducts on gas turbine engines extract a portion of the air from the flow path of the fan bypass duct and direct the air through a bleed duct to a heat exchanger to cool the engine. The flow of air through the bleed duct is typically controlled by a flow control valve, for example a butterfly valve. The flow control valve is closed during certain modes of engine operation, thereby preventing the flow of air through the bleed duct. When the valve is closed (or the amount of air leaking through the valve is sufficiently small) and air is flowing at a high rate through the fan bypass duct past the inlet of the bleed duct, the bleed duct may become dynamically unstable and undergo pressure oscillations of high magnitude. Dynamic pressure levels as high as 1.125 kg/cm (16 psi) peak-to-peak at a characteristic (i.e. natural) frequency have been observed, which can cause significant structural damage to the surfaces on which the dynamic pressure loading occurs. As a result, high dynamic pressure levels in the bleed ducts of gas turbine engines must be avoided.

The noise generation mechanism of a Hartmann Generator is governed by the same physical phenomena exhibited by a dynamically unstable bleed duct in a gas turbine engine. The Hartmann Generator consists of a circular nozzle for issuing an air jet that is operatively coupled with a relatively short, circular tube having an open end adjacent the nozzle and a closed end opposite the open end and the nozzle. The open end of the tube has a diameter approximately equal to the diameter of the air jet and is positioned only a few nozzle diameters downstream from the nozzle exit. The nozzle is oriented such that the air jet flows directly into the open end of the tube. As a result, high energy acoustic waves of a characteristic frequency are generated in the region between the nozzle exit and the open end of the tube.

The inlet of the bleed duct is positioned in a curved wall section of the fan bypass duct that allows a portion of the air flow through the bypass duct to enter the bleed duct essentially parallel to the longitudinal axis of the bleed duct. During certain modes of engine operation, a portion of the air flow through the fan bypass duct is routed directly into the inlet of the bleed duct such that high magnitude pressure oscillations result when the flow control valve is closed, or is leaking an insufficient amount of air. The usual method of avoiding dynamic pressure instability in gas turbine engines is to reduce the magnitude of the pressure oscillations by permitting the flow control valve to leak a sufficient amount of air. Recent engine operational requirements, however, do not permit valve leakage, and therefore, can cause unacceptably high dynamic pressure oscillations. In turn, the high dynamic pressure oscillations result in sonic fatigue damage and the failure of structural parts subjected to increased dynamic pressure loading, such as the surface of the bleed duct.

Like the Hartmann Generator, the physical mechanism behind the dynamic pressure instability is the periodic injection, pressurization and ejection of air from the bleed duct when the flow control valve is fully closed. The flow of air directly into the inlet of the bleed duct increases the air pressure and condenses the air in the bleed duct. The air is compressed similar to a spring until a resisting back pressure exceeds the air pressure and expels the air back out of the inlet. The expelled air diverts the air attempting to enter the inlet around the bleed duct. When the back pressure inside the bleed duct is sufficiently reduced, injection and pressurization resume until the ejection cycle is repeated. The bleed duct has a characteristic one-quarter wavelength organ pipe acoustic resonance, and the oscillating pressure fluctuations tend to couple in a non-linear, unstable fashion with the acoustic resonance, such that the frequency of pressure oscillations is related to, but not exactly equal to, the predictable acoustic resonance frequency of the bleed duct.

A second dynamic pressure instability mechanism that also results in acoustic resonances occurs when the air flow through the fan bypass duct grazes tangentially over the inlet of the bleed duct as opposed to entering the inlet directly. This second mechanism operates on bleed ducts having an inlet that defines an opening tangent to the flow of air through the fan bypass duct, or in other words, flush with the fan duct surface. The dynamic pressure instability resulting from this tangential flow mechanism is generally smaller in amplitude than the corresponding instability resulting from the Hartmann Generator mechanism.

Accordingly, there is a specific need for an apparatus for suppressing dynamic pressure instability in a bleed duct of a gas turbine engine when a flow control valve is fully closed.

There is also a specific need for a method of suppressing dynamic pressure instability in a bleed duct of a gas turbine engine when a flow control valve is fully closed.

There is a further specific need for an apparatus and method for reducing the magnitude of dynamic pressure oscillations within a bleed duct of a gas turbine engine, so as to avoid sonic fatigue damage and failures of structural parts subjected to dynamic pressure loading, without permitting a flow control valve to leak.

BRIEF DESCRIPTION OF THE INVENTION

The above mentioned needs are met by this invention, which in one aspect provides an apparatus and method for suppressing dynamic pressure instability in a bleed duct of a gas turbine engine that includes a flow diverter positioned adjacent an inlet of the bleed duct. The flow diverter is configured to prevent a flow of air in the fan bypass duct of the gas turbine engine from entering the inlet of the bleed duct when a flow control valve disposed within the bleed duct is closed, and to permit a portion of the flow of air to enter the inlet and pass through the bleed duct when the flow control valve is opened.

According to another aspect of the invention, an apparatus for suppressing dynamic pressure instability in a bleed duct of a gas turbine engine includes a fan bypass duct configured to permit a flow of air through the gas turbine engine during operation of the engine. The apparatus further includes a bleed duct having an inlet in fluid communication with the fan bypass duct and a flow control valve having an opened position and a closed position. The apparatus further includes a flow diverter positioned on a fan duct surface defined by the fan bypass duct in an upstream direction from the inlet of the bleed duct. The flow diverter diverts the flow of air through the gas turbine engine so that the flow of air is directed away from the inlet when the flow control valve is in the closed position.

According to another aspect of the invention, an apparatus for suppressing dynamic pressure instability in a bleed duct of a gas turbine engine includes a fan bypass duct configured to direct a flow of air through the gas turbine engine during operation of the engine. The fan bypass duct defines an upstream end, a downstream end opposite the upstream end, and a fan duct surface extending between the upstream end and the downstream end. The apparatus further includes a bleed duct having an inlet being positioned medially between the upstream end and the downstream end of the fan bypass duct in fluid communication with the fan bypass duct and a flow control valve. The flow control valve has an opened position for permitting a portion of the flow of air to enter into and pass through the bleed duct and a closed position for substantially preventing the flow of air from entering into and passing through the bleed duct. The apparatus further includes a flow diverter positioned on the fan duct surface between the upstream end and the downstream end of the fan bypass duct. The flow diverter being operable for diverting the flow of air beyond the inlet when the flow control valve is in the closed position.

According to another aspect of the invention, a flow diverter for a gas turbine engine has a fan bypass duct configured to permit a flow of air through the engine and a bleed duct for receiving a portion of the flow of air through an inlet defining an opening having a preselected width. The flow diverter includes an upstream end, a downstream end opposite the upstream end and proximate the inlet of the bleed duct, and a ramp surface extending between the upstream end and the downstream end. The ramp surface is spaced outwardly from the inlet a greater distance at the downstream end than at the upstream end, and the width of the ramp surface is greater than the preselected width of the opening defined by the inlet.

According to another aspect of the invention, a method for suppressing dynamic pressure instability in a bleed duct of a gas turbine engine includes providing a fan bypass duct configured to permit a flow of air through the gas turbine engine during operation of the engine, the fan bypass duct defining a fan duct surface. The method further includes providing a bleed duct defining a longitudinal axis and having an inlet in fluid communication with the fan bypass duct, wherein the bleed duct includes a flow control valve having an opened position and a closed position. The method further includes positioning a flow diverter on a fan duct surface defined by the fan bypass duct proximate the inlet of the bleed duct such that the flow diverter does not permit the flow of air through the gas turbine engine to enter the inlet of the bleed duct directly along the longitudinal axis of the bleed duct.

BRIEF DESCRIPTION OF THE DRAWINGS

The invention may be best understood by reference to the following description taken in conjunction with the accompanying drawing figures in which:

FIG. 3 is a detailed elevation view of a bleed duct according to one aspect of the invention illustrating the flow of air adjacent the inlet of the bleed duct with the flow control valve closed.

FIG. 4 is a detailed plan view of the bleed duct of FIG. 3 taken along the line 4-4.

DETAILED DESCRIPTION OF THE INVENTION

Figure 1:
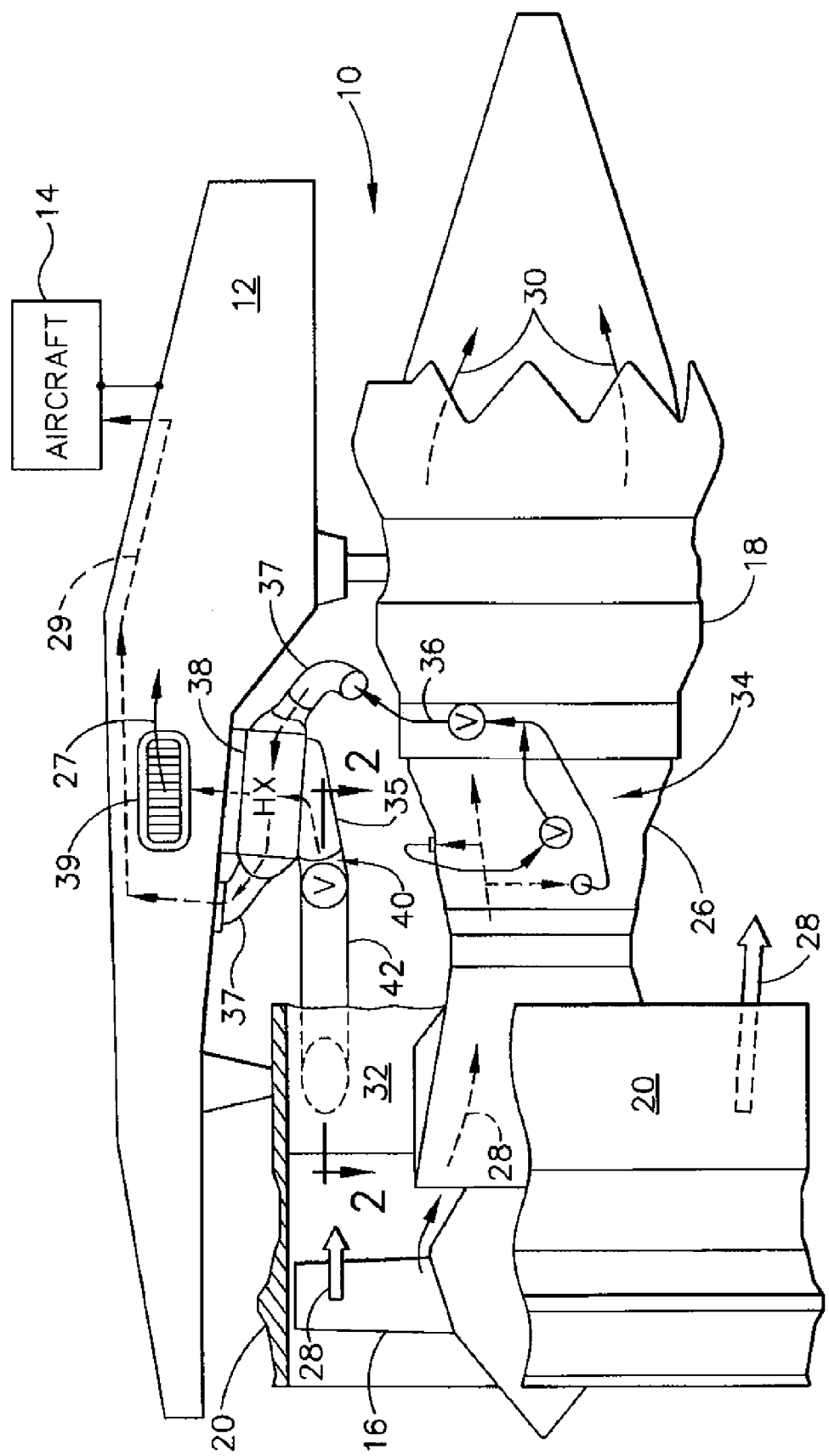
FIG. 1 is a partial sectional view of a gas turbine engine including a fan bypass duct and a bleed duct mounted to a support pylon of an aircraft.

Referring to the drawings in which identical reference numerals denote the same elements throughout the different views, FIG. 1 illustrates schematically a gas turbine engine, indicated generally at 10, mounted to a support pylon 12 of an aircraft 14. The engine 10 includes a fan 16 powered by a core engine 18. The fan 16 includes a plurality of fan blades rotatably mounted within an annular fan casing 20, with the fan casing in turn mounted to the inlet end of the core engine 18 in a conventional manner. The core engine 18 includes a multistage compressor 26 having sequential stages of stator vanes and/or rotor blades that pressurize an incoming flow of air 28. The pressurized air is discharged from the compressor 26 and mixed with fuel in the combustor of the core engine 18 to generate hot combustion gases 30 that flow downstream through high pressure and low pressure turbines. The high and low pressure turbines extract energy from the combustion gases 30 prior to the gases being discharged from the outlet end of the core engine 18. The high pressure turbine powers the compressor 26 of the core engine 18, and the low pressure turbine powers the fan 16.

The fan casing 20 surrounds the inlet end of the core engine 18 and defines a generally annular fan bypass duct 32 between the core engine and the fan casing. The majority of the incoming flow of air 28 pressurized by the fan 16 is discharged through outlet guide vanes (OGVs) adjacent the outlet end of the fan casing 20 to provide propulsive thrust for powering the aircraft 14. The remaining incoming flow of air 28 is directed through the radially inner portion of the fan 16 into the inlet end of the core engine 18 to be pressurized in the various stages of the compressor 26 and utilized in the combustion process. The gas turbine engine 10 typically includes a bleed system 34 for bleeding pressurized air from the compressor 26 during engine operation for subsequent use in the aircraft 14. The bleed system 34 includes a primary bleed circuit 36 comprising various conduits and valves for directing the pressurized air from the compressor 26 to the aircraft 14. In a particular example, the primary bleed circuit 36 is configured for bleeding pressurized air at increased pressure and temperature from the fifth and ninth stages of the compressor 26, and directing the bleed air to the aircraft 14 as needed.

The bleed system 34 further includes a conventional air-to-air pre-cooler or heat exchanger 38 suitably attached to the pylon 12 in relatively close proximity to the compressor 26. The heat exchanger 38 typically includes an exchange conduit 37 in fluid communication with the primary bleed circuit 36 for receiving the hot pressurized air from the compressor 26. The bleed system 34 further includes a secondary bleed circuit 40 that comprises various components configured for bleeding a portion of the relatively cool pressurized incoming flow of air 28 from the fan bypass duct 32 to the heat exchanger 38. The relatively cool incoming flow of air 28 is circulated from the secondary bleed circuit 40 through the heat exchanger 38 to cool the hot pressurized air from the compressor 26. The spent bleed air 27 from the secondary bleed circuit 40 is discharged from the heat exchanger 38 through a suitable outlet port 39 formed in the pylon 12 and dumped overboard during operation of the aircraft 14. The cooled bleed air 29 from the compressor 26 and the primary bleed circuit 36 is discharged from the heat exchanger 38 through the outlet end of the exchange conduit 37 and subsequently directed into the aircraft 14 for any suitable purpose. The bleed system 34 is controlled by a conventional aircraft control system (not shown) operatively coupled to the various valves V housed within the primary bleed circuit 36 and the secondary bleed circuit 40.

Figure 2:
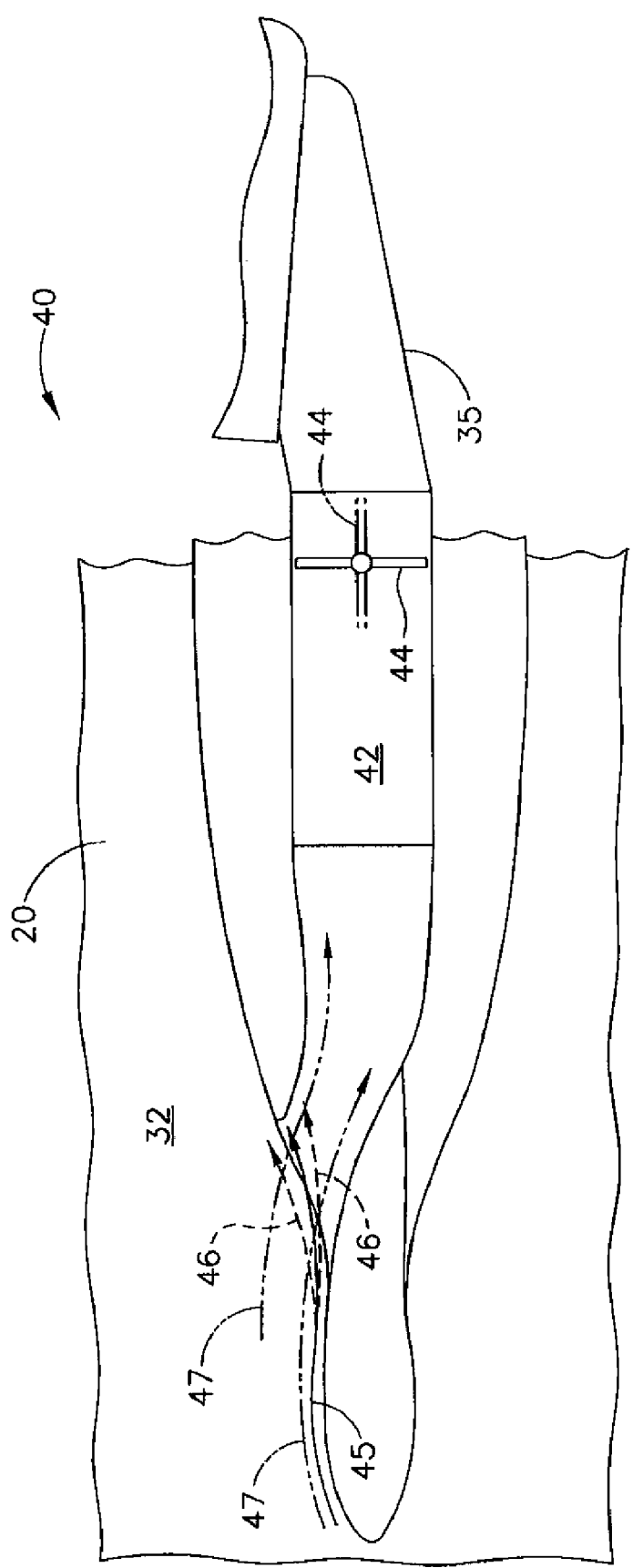
FIG. 2 is a detailed elevation view of the bleed duct of the gas turbine engine of FIG. 1 taken along the line 2-2 illustrating the flow of air into the inlet of the bleed duct with a flow control valve opened and closed.

As best shown in FIG. 2, the secondary bleed circuit 40 comprises a fan bleed duct 42 configured for bleeding a portion of the incoming flow of air 28 from the fan bypass duct 32 through a flow control valve 44 disposed at the outlet end of the fan bleed duct, which in turn is suitably connected by an exchange conduit 35 in fluid communication with the heat exchanger 38. The flow control valve 44 is electrically connected to the aircraft control system and may be operated to a fully opened position, indicated by double-dash broken lines, to allow substantially unobstructed passage of the incoming flow of air 28 from the fan bypass duct 32 through the fan bleed duct 42 into the heat exchanger 38. Alternatively, the flow control valve 44 may be operated to a fully closed position, indicated by solid lines, to prevent the passage of the incoming flow of air 28 through the fan bleed duct 42 into the heart exchanger 38.

The solid line arrow 45 in FIG. 2 represents the center flow line of the incoming flow of air 28 entering the inlet of the fan bleed duct 42 along the longitudinal axis of the bleed duct. The single-dash broken line arrows 46 represent the incoming flow of air 28 being directed into and alternately being directed away from the inlet of the fan bleed duct 42, thereby causing the noise generation mechanism of a Hartmann Generator and leading to dynamic pressure oscillations in the bleed duct when the flow control valve 44 is fully closed. The double-dash broken line arrows 47 represent the incoming flow of air 28 being directed into the inlet and through the fan bleed duct 42 with the flow control valve 44 fully opened. As previously mentioned, it is conventional practice to open the flow control valve 44 slightly from the fully closed position to permit a reduced passage of the flow of incoming air 28 through the fan bleed duct 42 and thereby alleviate the undesirable dynamic pressure oscillations resulting from the Hartmann Generator phenomenon. However, the conventional practice is unacceptable when engine operational requirements do not permit valve leakage.

Figure 5:
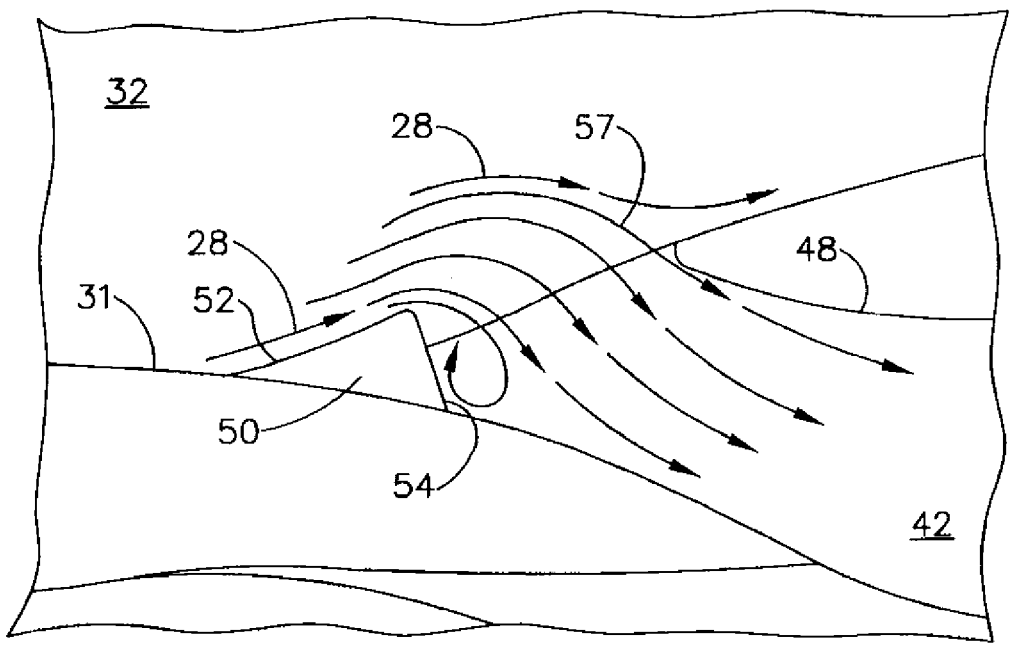
FIG. 5 is a detailed elevation view of the inlet of the bleed duct of FIG. 3 illustrating the flow of air adjacent the inlet with the flow control valve opened.

A fan bleed duct 42 according to one aspect of the invention is shown in FIGS. 3-5. The fan bleed duct, or simply bleed duct, 42 comprises an elongate, tubular conduit 48 having an inlet 41 at one end in fluid communication with the fan bypass duct 32, and an outlet 43 at the opposite end in fluid communication with the exchange conduit 35 leading to the heat exchanger 38. FIG. 3 is an elevation view of the bleed duct 42 illustrating the incoming flow of air 28 adjacent the inlet 41 with the flow control valve 44 fully closed. FIG. 4 is a plan view of the bleed duct 42 taken along line 4-4 in FIG. 3 with the incoming flow of air 28 not illustrated for purposes of clarity. The bleed duct 42 further comprises a flow diverter 50 adjacent the inlet 41 of the bleed duct. The flow diverter 50 is positioned on a fan duct surface 31 defined by the fan bypass duct 32 in an upstream direction from the inlet 41 of the bleed duct 42. As indicated by the solid line arrows 56 in FIG. 3, the flow diverter 50 diverts the incoming flow of air 28 through the fan bypass duct 32 so that the flow of air is directed away from the inlet 41 when the flow control valve 44 is in the closed position.

As shown in FIG. 4, the flow diverter 50 has an upstream end 51 and a downstream end 53 proximate the inlet 41 of the bleed duct, and defines a ramp surface 52 extending between the upstream end and the downstream end that is spaced outwardly from the fan duct surface 31. The ramp surface 52 is spaced outwardly from the fan duct surface 31 a greater distance at the downstream end 53 of the flow diverter 50 than at the upstream end 51. Accordingly, the flow diverter 50 further comprises a trailing surface 54 extending outwardly from the inlet 41 of the bleed duct 42 to the ramp surface 52. The downstream end 53 of the flow diverter 50 is preferably positioned such that the ramp surface 52 substantially overlaps the inlet 41. In the exemplary embodiment shown herein, no less than about fifty percent (50%) of the ramp surface 52 overlaps the inlet 41 of the bleed duct 42. The ramp surface 52 may have any suitable contour, for example flat or convex, but preferably has a concave profile for assisting the flow diverter 50 to divert the incoming flow of air 28 past the inlet 41 of the bleed duct 42.

Furthermore, the inlet 41 of the bleed duct 42 defines an opening having a preselected width and the flow diverter 50 has a width that is at least equal to the preselected width of the inlet. Preferably, the width of the ramp surface 52 of the flow diverter 50 is greater than the preselected width of the opening defined by the inlet 41. In the exemplary embodiment shown herein, the width of the ramp surface 52 is at least about 1.5 times greater than the preselected width of the inlet 41 of the fan bleed duct 42. A combination of the distance the ramp surface 52 is spaced outwardly from the fan duct surface 31 at the downstream end 53, the amount the ramp surface overlaps the inlet 41, the profile of the ramp surface, and the width of the ramp surface of the flow diverter 50 determines the extent to which the incoming flow of air 28 is diverted beyond the inlet of the bleed duct 42. As indicated by solid line arrows 56, the ramp surface 52 is sufficiently spaced from the fan duct surface 31, sufficiently overlaps the inlet 41 of the bleed duct 42, and has a profile sufficient to ensure that the incoming flow of air 28 re-attaches to the fan duct surface at a location downstream of the inlet. As such, substantially none of the incoming flow of air 28 is directed into the inlet 41 of the bleed duct 42 when the flow control valve 44 is in the closed position.

The specific design parameters of the flow diverter 50 may vary depending on the aircraft engine 14 and particular application. Accordingly, the design of the flow diverter 50 should be optimized for the type of aircraft engine 14 and the particular application for which the flow diverter is utilized. Examples of design parameters that may be varied include the distance upstream from the inlet 41 of the bleed duct 42 of the upstream end 51 and the downstream end 53 of the ramp surface 52; the distance the ramp surface is spaced outwardly from the fan duct surface 31; the shape of the ramp surface between the upstream end and the downstream end; and the width of the ramp surface relative to the opening defined by the inlet of the bleed duct.

FIG. 5 illustrates the incoming flow of air 28 adjacent the inlet 41 of the bleed duct 42 when the flow control valve 44 is opened. The flow diverter 50 diverts the incoming flow of air 28, while permitting a portion of the flow of air, indicated by the solid line arrows 57, to enter the inlet 41 and pass through the conduit 48 of the bleed duct 42 to the heat exchanger 38. In particular, opening flow control valve 44 creates a negative pressure in the conduit 48 of the bleed duct 42 and causes the portion 57 of the incoming flow of air 28 to flow over and around flow diverter 50 into inlet 41. As shown, a relatively small amount of the portion 57 of the incoming flow of air 28 forms a standing, rotating flow, commonly known as a "vortex" or "eddy current," adjacent the trailing surface 54 of the flow diverter 50 that does not enter the inlet 41. The flow diverter 50 may be modified to reduce the standing, rotating flow and thereby increase the portion 57 of the incoming flow of air 28 that is diverted into the inlet 41.

Figure 6:
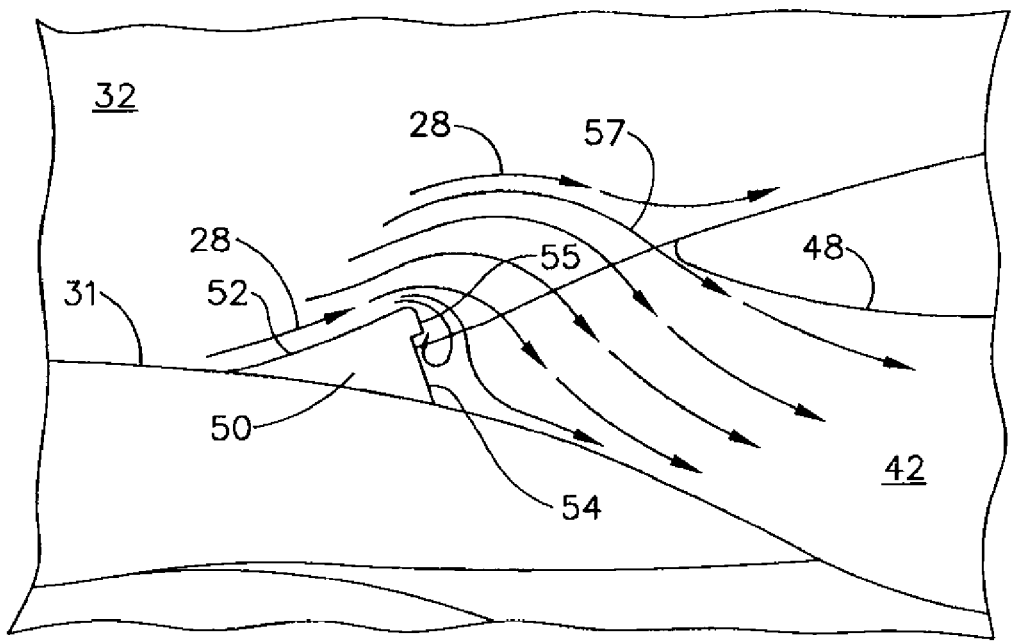
FIG. 6 is a detailed elevation view of another bleed duct according to another aspect of the invention illustrating the flow of air adjacent the inlet of the bleed duct with the flow control valve opened.

For example, as shown in FIG. 6, the trailing surface 54 of the flow diverter 50 may provided with a projection, or step, 55 adjacent the ramp surface 52 that extends in the downstream direction towards the inlet 41. The step 55 produces the known "Coanda Effect" on the flow of incoming air 28 across the width of the ramp surface 52. The Coanda Effect, also known as boundary layer attachment, causes the incoming flow of air 28 to remain attached to the trailing surface 54 beyond the point where the flow of air would be expected to separate from the trailing surface in the absence of step 55. As a result of the step 55, less of the incoming flow of air 28 separates from the trailing surface 54. Thus, more of the flow of incoming air remains attached to the trailing surface 54 and is received through the inlet 41 of the bleed duct 42 when the flow control valve 44 is opened. Although a projection is shown, the trailing surface 54 may also be formed with a convex profile to provide the desired Coanda Effect.

In another aspect, the invention also provides a method for suppressing dynamic pressure instability in a bleed duct 42 of a gas turbine engine 10. A fan bypass duct 32 is configured to permit an incoming flow of air 28 through the gas turbine engine 10 during operation of the engine. As previously described, the fan bypass duct 32 defines a fan duct surface 31. The method further includes providing a bleed duct 42 defining a longitudinal axis and having an inlet 41 in fluid communication with the fan bypass duct 32. As previously described, the bleed duct 42 comprises a flow control valve 44 having an opened position and a closed position. The method further includes positioning a flow diverter 50 on the fan duct surface 31 proximate the inlet 41 of the bleed duct 42 such that the flow diverter does not permit the incoming flow of air 28 to enter the inlet of the bleed duct directly along the longitudinal axis of the bleed duct. In particular, the flow diverter 50 is operable for preventing the incoming flow of air 28 to enter the inlet 41 of the bleed duct 42 from the fan bypass duct 32 when the flow control valve 44 is in the closed position. The flow diverter 50 is also operable for permitting a portion 57 of the incoming flow of air 28 to enter the inlet 41 of the bleed duct 42 when the flow control valve 44 is in the opened position.

In an exemplary embodiment of the method, the flow diverter 50 comprises an upstream end 51, a downstream end 53 opposite the upstream end, and a ramp surface 52 extending between the upstream end and the downstream end that is spaced outwardly from the fan duct surface 31. The ramp surface 52 is spaced outwardly from the fan duct surface 31 a greater distance at the downstream end 53 of the flow diverter 50 than at the upstream end 51 of the flow diverter. The inlet 41 defines an opening having a preselected width and the flow diverter 50 has a width that is at least equal to the preselected width of the inlet. Preferably, the width of the ramp surface 52 of the flow diverter 50 is at least about 1.5 times greater than the preselected width of the opening defined by the inlet 41.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for suppressing dynamic pressure instability in a bleed duct of a gas turbine engine, the apparatus comprising:
   a fan bypass duct configured to permit a flow of air through the gas turbine engine during operation of the engine, the fan bypass duct defining a fan duct surface;
   a bleed duct having an inlet in fluid communication with the fan bypass duct and a flow control valve having an opened position and a closed position; and
   a flow diverter positioned on the fan duct surface in an upstream direction from the inlet of the bleed duct for diverting the flow of air through the gas turbine engine so that the flow of air is directed away from the inlet when the flow control valve is in the closed position, wherein the flow diverter has an upstream end and a downstream end proximate the inlet of the bleed duct, and wherein the flow diverter defines a ramp surface extending between the upstream end and the downstream end and spaced outwardly from the fan duct surface.

2. The apparatus of claim 1, wherein the ramp surface is spaced outwardly from the fan duct surface a greater distance at the downstream end of the flow diverter than at the upstream end of the flow diverter.

3. The apparatus of claim 1, wherein the downstream end of the flow diverter is positioned such that the ramp surface overlaps the inlet of the bleed duct.

4. The apparatus of claim 3, wherein no less than about fifty percent (50%) of the ramp surface overlaps the inlet of the bleed duct.

5. The apparatus of claim 1, wherein the contour of the ramp surface defines concave profile.

6. The apparatus of claim 1, wherein the inlet of the bleed duct defines an opening having a preselected width and wherein the flow diverter has a width that is at least equal to the preselected width of the inlet.

7. The apparatus of claim 6, wherein the width of the flow diverter is at least about 1.5 times greater than the preselected width of the inlet.

8. An apparatus for suppressing dynamic pressure instability in a bleed duct of a gas turbine engine, the apparatus comprising:
   a fan bypass duct configured to direct a flow of air through the gas turbine engine during operation of the engine, the fan bypass duct defining an upstream end, a downstream end opposite the upstream end and a fan duct surface extending between the upstream end and the downstream end;
   a bleed duct having an inlet in fluid communication with the fan bypass duct and a flow control valve having an opened position for permitting a portion of the flow of air to enter into and pass through the bleed duct and a closed position for substantially preventing the flow of air from entering into and passing through the bleed duct, the inlet being positioned medially between the upstream end and the downstream end of the fan bypass duct; and
   a flow diverter positioned on the fan duct surface between the upstream end and the downstream end of the fan bypass duct, the flow diverter being operable for diverting the flow of air beyond the inlet when the flow control valve is in the closed position, wherein the flow diverter comprises an upstream end and a downstream end proximate the inlet of the bleed duct and a ramp surface extending between the upstream end and the downstream end that is spaced outwardly from the fan duct surface.

9. The apparatus of claim 8, wherein the ramp surface is spaced outwardly from the fan duct surface a greater distance at the downstream end of the flow diverter than at the upstream end of the flow diverter.

10. The apparatus of claim 9, wherein the downstream end of the flow diverter is positioned such that the ramp surface overlaps the inlet of the bleed duct.

11. The apparatus of claim 8, wherein the inlet of the bleed duct defines an opening having a preselected width and wherein the flow diverter has a width that is at least equal to the preselected width of the inlet.

12. A flow diverter for a gas turbine engine having a fan bypass duct configured to permit a flow of air through the engine and a bleed duct for receiving a portion of the flow of air through an inlet defining an opening having a preselected width, the flow diverter comprising:
   an upstream end;
   a downstream end opposite the upstream end and proximate the inlet of the bleed duct; and
   a ramp surface extending between the upstream end and the downstream end, the ramp surface being spaced outwardly from the inlet a greater distance at the downstream end than at the upstream end and the width of the ramp surface being greater than the preselected width of the opening defined by the inlet, wherein the portion of the flow of incoming air is directed into the inlet and passed through the bleed duct when a flow control valve disposed within the bleed duct is in an opened position and is diverted away from the inlet and not passed through the bleed duct when the flow control valve is in a closed position.

13. The flow diverter of claim 12, further comprising a trailing surface extending outwardly from the inlet of the bleed duct to the ramp surface, the trailing surface including a step adjacent the ramp surface that produces a Coanda Effect to increase the portion of the flow of incoming air that is received through the inlet of the bleed duct.

14. A method for suppressing dynamic pressure instability in a bleed duct of a gas turbine engine, the method comprising:
   providing a fan bypass duct configured to permit a flow of air through the gas turbine engine during operation of the engine, the fan bypass duct defining a fan duct surface;
   providing a bleed duct defining a longitudinal axis and having an inlet in fluid communication with the fan bypass duct, the bleed duct comprising a flow control valve having an opened position and a closed position; and
   positioning a flow diverter on the fan duct surface proximate the inlet of the bleed duct such that the flow diverter does not permit the flow of air through the gas turbine engine to enter the inlet of the bleed duct directly along the longitudinal axis of the bleed duct, wherein the flow diverter comprises an upstream end, a downstream end opposite the upstream end, and a ramp surface extending between the upstream end and the downstream end that is spaced outwardly from the fan duct surface.

15. The method of claim 14, wherein the flow diverter is operable for preventing the flow of air to enter the inlet of the bleed duct from the fan bypass duct when the flow control valve is in the closed position.

16. The method of claim 14, wherein the flow diverter is operable for permitting a portion of the flow of air through the gas turbine engine to enter the inlet of the bleed duct when the flow control valve is in the opened position.

17. The method of claim 14, wherein the ramp surface is spaced outwardly from the fan duct surface a greater distance at the downstream end of the flow diverter than at the upstream end of the flow diverter.

18. The method of claim 14, wherein the inlet defines an opening having a preselected width and wherein the flow diverter has a width that is at least equal to the preselected width of the inlet.

* * * * *